(12) United States Patent
Kobayashi et al.

(10) Patent No.: US 11,615,126 B2
(45) Date of Patent: Mar. 28, 2023

(54) ANALYZING APPARATUS, ANALYZING METHOD, AND COMPUTER PROGRAM PRODUCT

(71) Applicant: KABUSHIKI KAISHA TOSHIBA, Minato-ku (JP)

(72) Inventors: Yuka Kobayashi, Seto (JP); Hiroshi Fujimura, Yokohama (JP); Kenji Iwata, Machida (JP); Takami Yoshida, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 175 days.

(21) Appl. No.: 16/803,448

(22) Filed: Feb. 27, 2020

(65) Prior Publication Data

US 2021/0073253 A1    Mar. 11, 2021

(30) Foreign Application Priority Data

Sep. 6, 2019    (JP) .............................. JP2019-162678

(51) Int. Cl.
*G06F 40/20*    (2020.01)
*G06F 16/332*    (2019.01)
(Continued)

(52) U.S. Cl.
CPC ........ *G06F 16/3329* (2019.01); *G06F 16/353* (2019.01); *G06F 40/242* (2020.01);
(Continued)

(58) Field of Classification Search
None
See application file for complete search history.

(56) References Cited

U.S. PATENT DOCUMENTS 6,477,551 B1 * 11/2002 Johnson ................ G06F 40/284
707/999.005
7,921,379 B1    4/2011 Ko
(Continued)

FOREIGN PATENT DOCUMENTS

JP    2003-519842 A    6/2003
JP    2007-293685 A    11/2007
(Continued)

OTHER PUBLICATIONS

Nikola Mrksic, et al., "Counter-fitting Word Vectors to Linguistic Constraints", Proceedings of NAACL-HLT, 2016, pp. 142-148.
(Continued)

*Primary Examiner* — Richard Z Zhu
(74) *Attorney, Agent, or Firm* — Oblon, McClelland, Maier & Neustadt, L.L.P.

(57) ABSTRACT

An analyzing apparatus according to an embodiment includes a memory and a hardware processor coupled to the memory. The hardware processor is configured to: calculate a first similarity between a first word representing a category and a second word; apply, to one or more template sentences, each of one or more second words having the first similarity higher than a first threshold; analyze the one or more template sentences each including the second word and classify the second word into one or more first categories; and display, for each of the first categories, the second word used in the classification into the first categories on a display device.

11 Claims, 13 Drawing Sheets

(51) Int. Cl.
  *G06F 16/35* (2019.01)
  *G10L 15/22* (2006.01)
  *G10L 15/08* (2006.01)
  *G06F 40/242* (2020.01)
  *G06F 40/279* (2020.01)
  *G06F 40/247* (2020.01)
  *G06F 40/30* (2020.01)
  *G06F 40/295* (2020.01)

(52) U.S. Cl.
  CPC .............. *G10L 15/08* (2013.01); *G10L 15/22* (2013.01); *G06F 40/247* (2020.01); *G06F 40/279* (2020.01); *G06F 40/295* (2020.01); *G06F 40/30* (2020.01); *G10L 2015/088* (2013.01); *G10L 2015/223* (2013.01)

(56) References Cited

U.S. PATENT DOCUMENTS

| | | | |
|---|---|---|---|
| 7,957,968 B2 * | 6/2011 | Gupta | G06F 40/237 704/243 |
| 8,600,930 B2 * | 12/2013 | Sata | G06F 40/242 704/7 |
| 8,781,813 B2 * | 7/2014 | Cooper | G06F 40/263 704/9 |
| 9,448,992 B2 * | 9/2016 | Shmiel | G06F 16/3329 |
| 9,606,980 B2 * | 3/2017 | Andrejko | G06F 40/56 |
| 10,031,967 B2 * | 7/2018 | Venkataraman | G06N 5/022 |
| 10,133,735 B2 * | 11/2018 | Venkataraman | G06F 16/2455 |
| 10,229,683 B2 * | 3/2019 | Leeb | G10L 15/18 |
| 10,255,271 B2 * | 4/2019 | Alba | G06F 40/30 |
| 10,402,491 B2 * | 9/2019 | Hosabettu | G06F 40/242 |
| 11,334,721 B2 * | 5/2022 | Popescu | G06F 40/247 |
| 2002/0099730 A1 * | 7/2002 | Brown | G06F 16/30 715/256 |
| 2005/0033568 A1 * | 2/2005 | Yu | G06F 40/247 704/10 |
| 2005/0137855 A1 * | 6/2005 | Maxwell | G06F 40/56 704/9 |
| 2013/0173247 A1 * | 7/2013 | Hodson | G06F 40/45 704/4 |
| 2013/0297304 A1 * | 11/2013 | Kim | G10L 15/22 704/231 |
| 2015/0012806 A1 * | 1/2015 | Soni | G06F 16/9535 715/205 |
| 2015/0039292 A1 * | 2/2015 | Suleman | G06F 40/30 704/9 |
| 2017/0249297 A1 * | 8/2017 | Venkataraman | G06F 40/211 |
| 2018/0173696 A1 * | 6/2018 | Hosabettu | G06F 16/36 |
| 2018/0173698 A1 * | 6/2018 | Dubey | G06F 40/30 |
| 2019/0213284 A1 * | 7/2019 | Anand | G06F 40/35 |
| 2020/0201917 A1 * | 6/2020 | Suzuki | G06Q 50/184 |
| 2020/0265117 A1 * | 8/2020 | Jagan | G06F 40/284 |

FOREIGN PATENT DOCUMENTS

| | | |
|---|---|---|
| JP | 2008-305268 A | 12/2008 |
| JP | 4769005 B2 | 9/2011 |

OTHER PUBLICATIONS

Qi Li, et al., "Learning Word Sense Embeddings from Word Sense Definitions", arXiv:1606.04835v4, LPCC-ICCPOL, Oct. 24, 2016, 12 pages.

Liang-Chih Yu, et al., "Refining Word Embeddings for Sentiment Analysis" Proceedings of the 2017 Conference on Empirical Methods in Natural Language Processing, 2017, pp. 534-539.

* cited by examiner

FIG.5

| CATEGORY | SEARCH KEYWORDS |
|---|---|
| MUSICAL INSTRUMENT | WIND INSTRUMENT, STRINGED INSTRUMENT, PERCUSSION INSTRUMENT, PIANO, GUITAR, TRUMPET, SAXOPHONE |
| CLOTHING | CARDIGAN, SKIRT, BLOUSE, TROUSERS, T-SHIRT (0.6) |
| SPORT WEAR | SHOES, SWIMWEAR, T-SHIRT (0.4), SWEATER, TRAINING SUIT |
| CAKE | CHOCOLATE CAKE, CHIFFON CAKE, SCONE, MUFFIN, POUND CAKE (0.6), BAKED SWEETS (0.3) |
| COOKIE | BISCUIT, SABLE, CHOCOLATE, BAKED SWEETS (0.7), POUND CAKE (0.4) |

ANALYZING APPARATUS, ANALYZING METHOD, AND COMPUTER PROGRAM PRODUCT

CROSS-REFERENCE TO RELATED APPLICATIONS

This application is based upon and claims the benefit of priority from Japanese Patent Application No. 2019-162678, filed on Sep. 6, 2019; the entire contents of which are incorporated herein by reference.

FIELD

Embodiments described herein relate generally to an analyzing apparatus, an analyzing method, and a computer program product.

BACKGROUND

In search executed by entering a natural sentence, it is necessary for every word (search keyword) entered by users to be covered in advance. Conventionally, developers have been manually entering search keywords associated with a piece of content. Therefore, developers have needed to think what kind of search keywords users will use, for every piece of content. Hence, it has been costly to generate a database. It has been possible to expand a keyword by using a synonym dictionary or the like. However, it has still been necessary to enter other words, e.g., words with a similar meaning, manually. Having been put into recent use is a technology of a similarity calculator that is trained with a model of similarities of words using a large number of documents, and that calculates a semantic similarity between words.

BRIEF DESCRIPTION OF THE DRAWINGS

FIG. 8 is a schematic illustrating an example of display information for receiving a change of a category in the second embodiment;

FIG. 9 is a schematic illustrating an example of display information for receiving a deletion of a category in the second embodiment;

DETAILED DESCRIPTION

According to an embodiment of the present disclosure, an analyzing apparatus includes a memory and a hardware processor coupled to the memory. The hardware processor is configured to: calculate a first similarity between a first word representing a category and a second word; apply, to one or more template sentences, each of one or more second words having the first similarity higher than a first threshold; analyze the one or more template sentences each including the second word and classify the second word into one or more first categories; and display, for each of the first categories, the second word used in the classification into the first categories on a display device.

An analyzing apparatus, an analyzing method, and a computer program product according to embodiments of the present disclosure will be explained in detail with reference to the appended drawings.

First Embodiment

Example of Functional Configuration of Analyzing Apparatus

Figure 1:
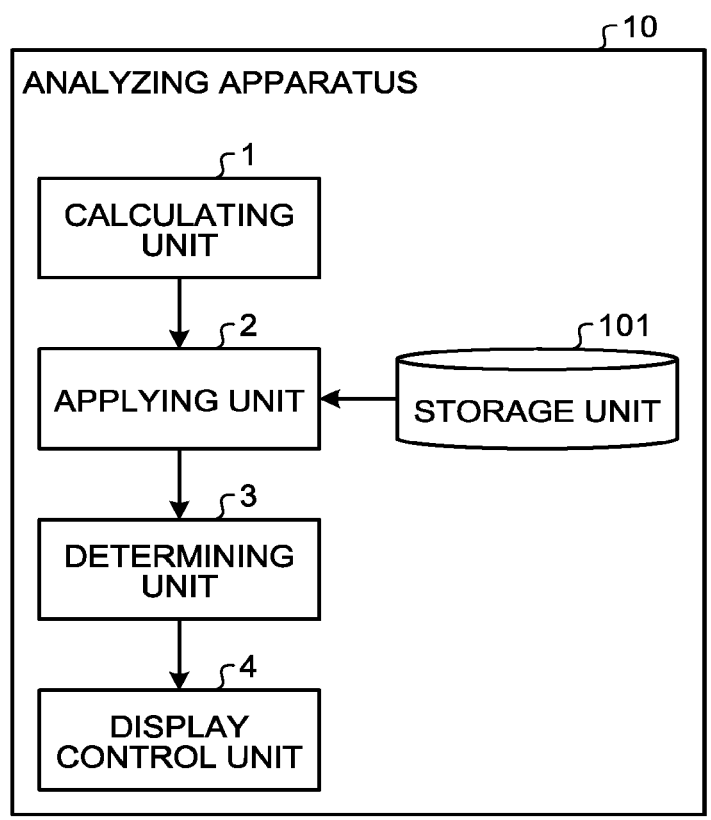
FIG. 1 is a block diagram illustrating an example of a functional configuration of an analyzing apparatus according to a first embodiment.

FIG. 1 is a block diagram illustrating an example of a functional configuration of an analyzing apparatus 10 according to a first embodiment. The analyzing apparatus 10 according to the first embodiment includes a calculating unit 1, an applying unit 2, a determining unit 3, a display control unit 4, and a storage unit 101.

The storage unit 101 stores information. The storage unit 101 stores pieces of content (a content database) classified into categories. Examples of the categories include genres of merchandise such as clothing, bags, and accessories, genres of food such as Japanese, Chinese, and Western foods, target users such as females and males, and price ranges such as a high price range and a low price range. An example of the content includes stores that sell the merchandise. One or more categories are registered for the content.

The calculating unit 1 calculates a similarity (first similarity) between a word (first word) representing a category and a word (second word). The word representing a category may be received in any way. For example, the first word may be entered directly by a user, or may be selected by the user from a plurality of first words.

As another example, the word (first word) representing a category may be acquired from input information such as speech data. When the speech data is received, the calculating unit 1 calculates a similarity (second similarity) between a word (third word) included in the speech data and words (first words) representing categories. The calculating unit 1 then calculates a similarity (first similarity) between a word (first word), which has a similarity (second similarity) higher than a threshold (second threshold), and a word (second word). For example, when the input information is a user speech "I want to buy a guitar", a category word "musical instrument" is acquired as the word having the similarity (second similarity) higher than the threshold (second threshold) with respect to the word "guitar". In this example, the calculating unit 1 then calculates a similarity (first similarity) between the category word "musical instrument" and a word (second word).

Specifically, the calculating unit 1 calculates a semantic similarity between words. The similarity may be calculated by using any specific method. For example, when the ways in which the words are used in documents are more similar, the calculating unit 1 calculates a higher similarity. It is also possible to configure the calculating unit 1 to output words having a higher similarity to a certain word (words having a similarity higher than a threshold).

The applying unit 2 inputs a word representing the category (first word) to the calculating unit 1. The applying unit 2 receives, from the calculating unit 1, one or more words (second words) having a similarity (first similarity) higher than a threshold (first threshold). For example, when the category is "musical instrument", the applying unit 2 receives words "guitar", "piano", "recorder", and "harp" from the calculating unit 1. The applying unit 2 applies, to one or more template sentences, each of the one or more words received from the calculating unit 1. Each template sentence represents, for example, a speech sentence used to search for content. Each template sentence is generated based on a large number of speech sentences collected in advance, for example. Specifically, examples of the template sentence include "I want to buy [musical instrument]", "I want [musical instrument]", "Where is a store selling [musical instrument]?", and "[musical instrument]". Each of the words "guitar", "piano", "recorder", and "harp" is applied to the [musical instrument] part.

The determining unit 3 analyzes the template sentences containing each word (second word) and classifies the word into one or more categories (first categories). Specifically, in the foregoing example, the determining unit 3 analyzes "I want to buy a guitar" and classifies "guitar" into a category "musical instrument".

The template sentences (speech sentences) may be analyzed by any method. For example, a large number of speech sentences used to search for content are collected in advance, and a label is assigned to each of the speech sentences to represent that which category is referred to by the corresponding speech sentence. A model is then created by using the collected speech sentences as training data. Some training methods are available, and one example will now be explained. When the speech sentences included in the training data is in a language in which words are not separated (for example, the Japanese language), morphological analysis is performed on the speech sentence, and the speech sentence is separated into words. The category word, which has been registered for the content, is then acquired. The similarity between a word included in the speech sentence and the category word is then calculated by the calculating unit 1. The model is then trained by using the word included in the speech sentence and the calculated similarity as feature values, and using the labelled category as a correct answer. When the determining unit 3 performs actual analysis, it calculates the similarity between a word included in a template sentence applied with the word and each of the categories in the same manner as that described above, and classifies the word into a category.

The calculating unit 1 simply calculates a similarity between words. Thus, the use of the calculating unit 1 alone is not enough to determine which keyword is mapped to which category. Actually, the mapping between a keyword and a category is not determined based solely on the similarity. Depending on how the dialogue system is designed, a keyword may be mapped to a different category depending on the wording of a speech sentence. For example, when a speech sentence is worded by "I want to buy clothing for kids", a keyword "kids" is mapped to a category "for kids". In contrast, when a speech sentence is worded by "places where we can go with kids", the keyword "kids" is mapped to a category "for families".

The determining unit 3 is provided based on the similarities calculated by the calculating unit 1. The determining unit 3 collects in advance a large number of speech sentences for searching and trains, by using the speech sentences and the calculating unit 1, a model used for determining which categories the keyword included in the speech sentence is to be mapped. The determining unit 3 uses a trained model, and it is not possible to check directly what keywords are mapped to which categories. Furthermore, machine learning is carried out based on a large number of speech sentences, so that unfavorable keywords may be mapped to a category. Therefore, the developers are required to check and to change the unfavorable keywords.

The display control unit 4 displays, for each of the categories (first categories), the words (second words) used in the classification into the categories (first categories) on a display unit. The display unit is a display device such as a liquid crystal display, for example. The display unit may be provided to the analyzing apparatus 10, or provided to an external device.

The database to store content is created for each domain of the dialogue system. In an example of store search, a domain is partitioned correspondingly to each facility, such as a department store or a shopping center including a plurality of stores. The domain may also be partitioned correspondingly to each target of search, such as store search, product search, or service search.

The calculating unit 1 and the determining unit 3 described above may be customized for each of the domains, or may be shared among the domains.

Spoken dialogue processing for enabling a user to search content with a dialogue system that uses the functions of the analyzing apparatus 10 (the calculating unit 1, the determining unit 3, and the storage unit 101) will now be explained.

Example of Functional Configuration of Dialogue System

Figure 2:
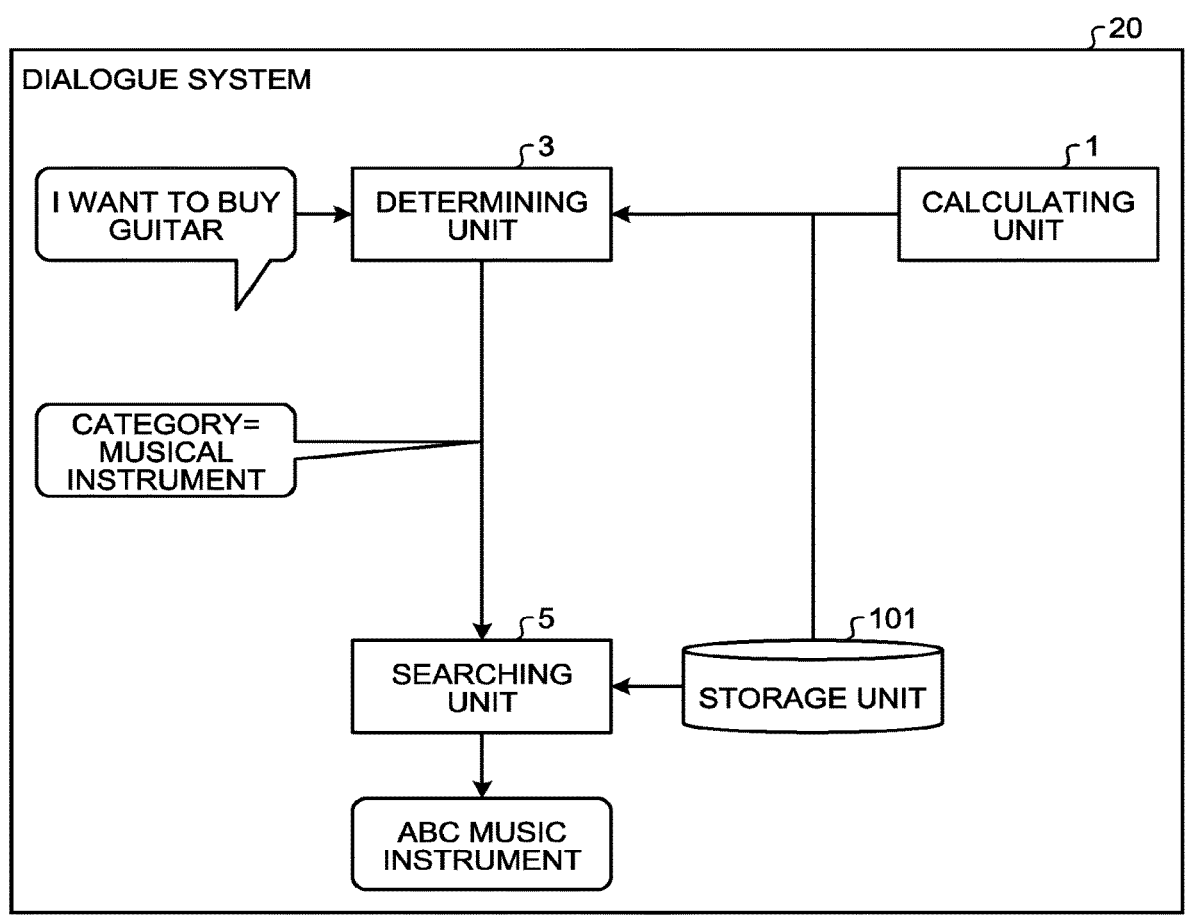
FIG. 2 is a block diagram illustrating an example of a functional configuration of a dialogue system according to the first embodiment.

FIG. 2 is a block diagram illustrating an example of a functional configuration of a dialogue system 20 according to the first embodiment. The dialogue system 20 according to the first embodiment includes the calculating unit 1, the determining unit 3, a searching unit 5, and the storage unit 101. Since the calculating unit 1, the determining unit 3, and the storage unit 101 are the same as those illustrated in FIG. 1, explanations thereof are omitted.

The searching unit 5 searches for content based on the categories (first categories) into which words are classified by the determining unit 3. A method for searching content will be explained in detail with reference to FIG. 3.

The analyzing apparatus 10 and the dialogue system 20 may be implemented on the same apparatus. In this embodiment, for the purpose of explanation, this apparatus will be referred to as the analyzing apparatus 10 in the explanation of an operation thereof in an analyzing process, and will be referred to as the dialogue system 20 in the explanation of an operation thereof in spoken dialogue processing.

Figure 3:
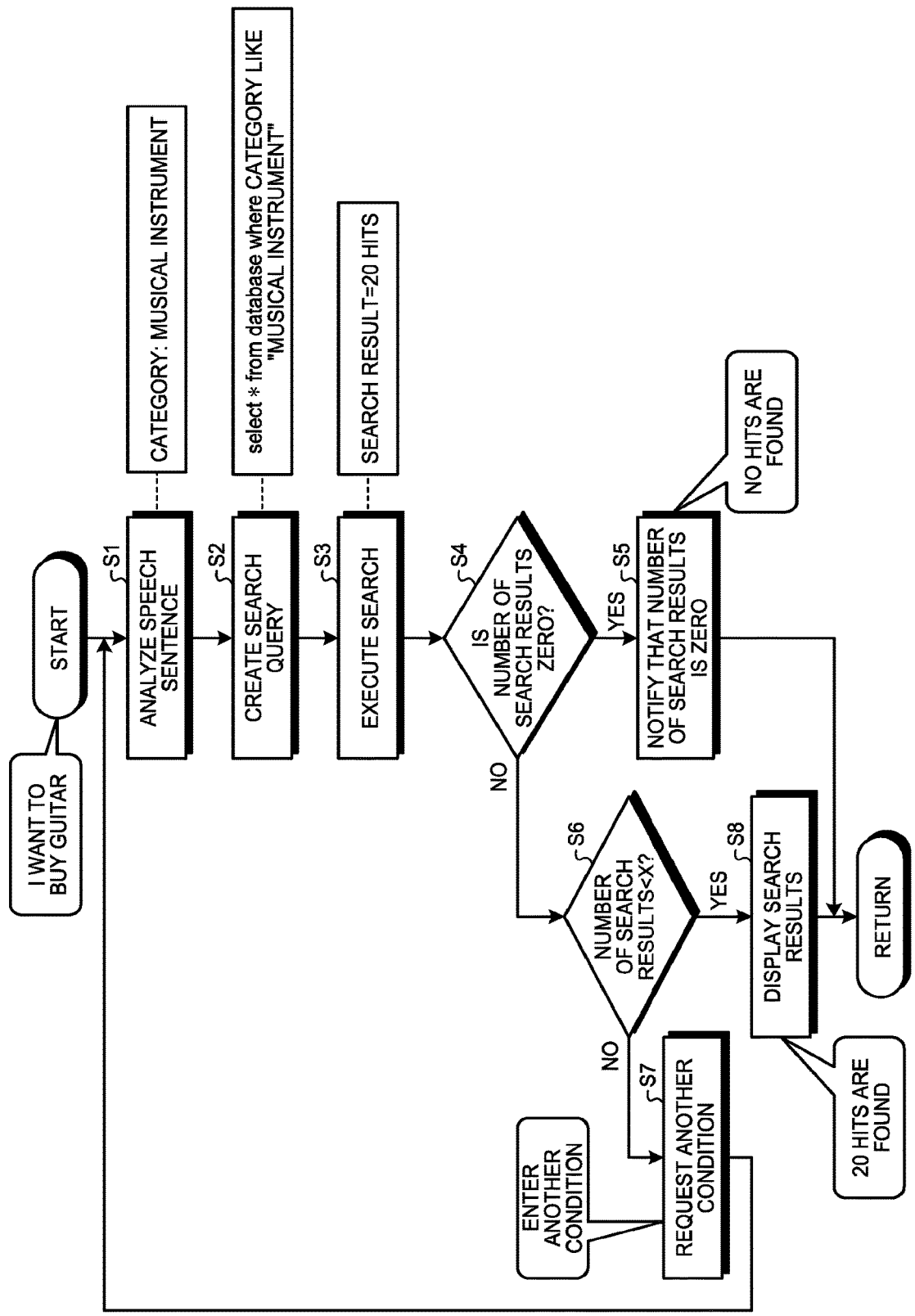
FIG. 3 is a flowchart illustrating an example of spoken dialogue processing according to the first embodiment.

FIG. 3 is a flowchart illustrating an example of spoken dialogue processing according to the first embodiment. Illustrated in FIG. 3 is an example in which a user's speech input is "I want to buy a guitar".

To begin with, the speech sentence is analyzed (Step S1). Specifically, the category "musical instrument" is output as a result of the processes performed by the calculating unit 1 and the determining unit 3 described above.

The searching unit 5 then creates one or more search queries based on the category "musical instrument" obtained as a result of the process at Step S1 (Step S2). Included in the search query is a word (search keyword) having a degree of association, which is higher than a threshold, with the category "musical instrument". The degree of association will be described later.

The searching unit 5 searches for the content by using the search queries created in the process at Step S2 (Step S3). The searching unit 5 then determines whether the number of search results is zero (Step S4). When the number of search results is zero (Yes at Step S4), the searching unit 5 issues a notification that the number of the search result is zero (Step S5) and ends the process.

When the number of the search results is not zero (No at Step S4), the searching unit 5 determines whether the number of search results is smaller than X (a threshold) (Step S6). When the number of search results is equal to or more than X (No at Step S6), the searching unit 5 requests another condition (Step S7). When the number of search results is smaller than X (Yes at Step S6), the searching unit 5 displays the search results on the display unit (Step S8).

To create a new domain of the dialogue system 20 illustrated in FIG. 2 described above, to begin with, a database (content DB) for storing content is created. When the calculating unit 1, the database for storing the template sentences (template sentence DB), and the determining unit 3 are to be shared among the domains, existing units and database may be used.

When the calculating unit 1, the template sentence DB, and the determining unit 3 are to be used for each individual domain, a large number of speech sentences for searching the content DB are collected, and the calculating unit 1, the template sentence DB, and the determining unit 3 are provided based on the speech sentences.

When the functional blocks of the analyzing apparatus 10 and the dialogue system 20 are to be shared among the domains, only required is to design a content DB when creating a new domain. Moreover, since it is not necessary to come up with synonyms and similar words for each category, only required is registration of the categories to the content. However, at this point in time, a user does not know which search keyword will be actually used in search of content. As the search keywords, words having a degree of association, which is higher than a prescribed threshold, with a category will be used.

Therefore, the determining unit 3 determines a degree of association between a category (first category) and a word (second word), based on the number of template sentences used in classifying this word into the category. The display control unit 4 then displays the degree of association and the word in such a manner that the word is appended with the degree of association. By this display manner, the user can easily get a grasp of the words associated with the category.

Figure 4:
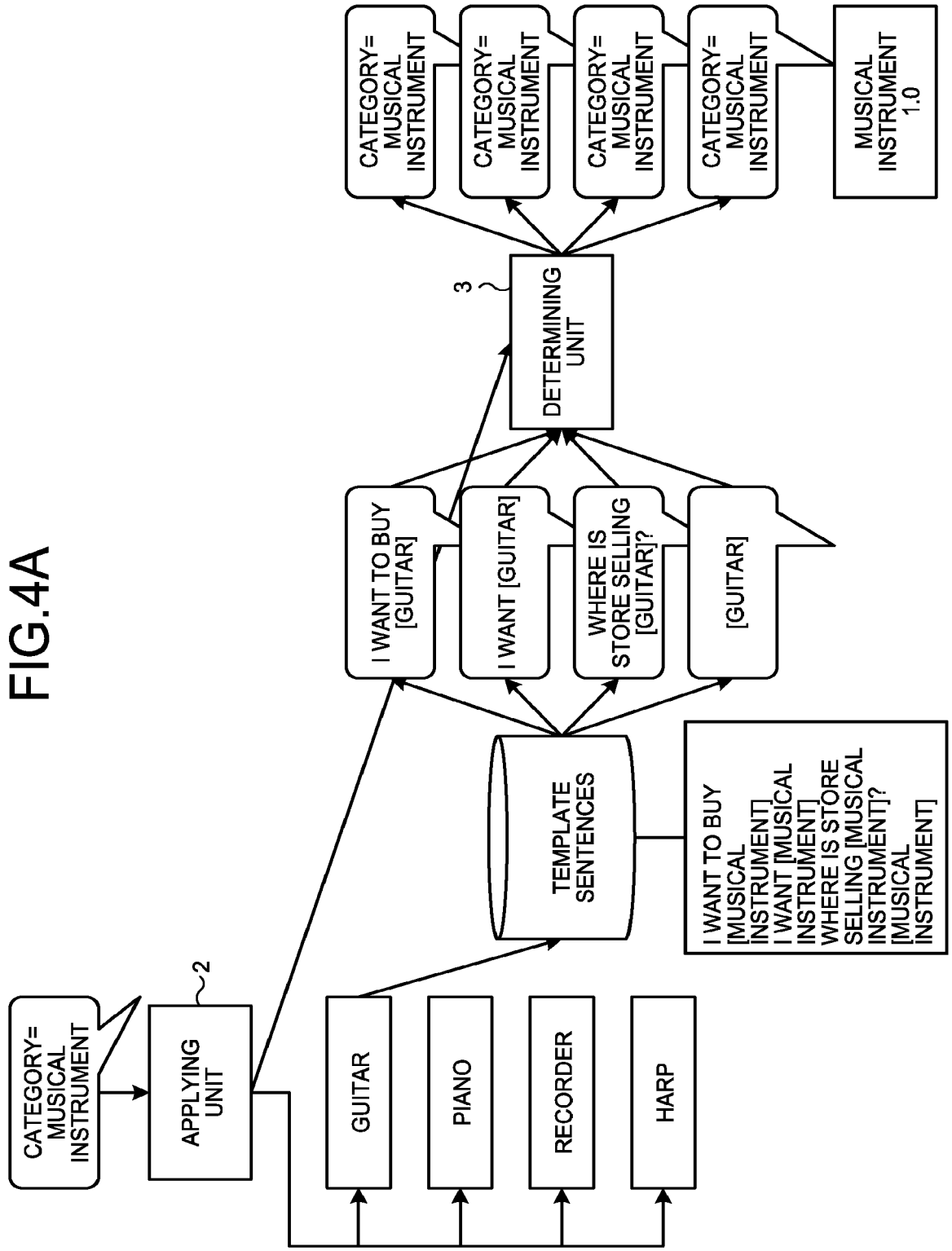
FIG. 4A is a schematic illustrating a first example of a calculation of a degree of association between a word and a category in the first embodiment.
FIG. 4B is a schematic illustrating a second example of the calculation of a degree of association between a word and categories in the first embodiment.

FIG. 4A is a schematic illustrating a first example of a calculation of a degree of association between a word and a category in the first embodiment. The applying unit 2 inputs the category "musical instrument" to the calculating unit 1 and applies the one or more words (second words) received from the calculating unit 1 to one or more template sentences. In the example illustrated in FIG. 4A, "guitar", "piano", "recorder", and "harp" are illustrated as the one or more words received from the calculating unit 1.

The determining unit 3 analyzes the template sentences containing each of such words (second words) and classifies each word into one or more categories (first categories). In the example illustrated in FIG. 4A, the determining unit 3 analyzes "I want to buy a guitar" and then classifies "guitar" into the category "musical instrument". The determining unit 3 also analyzes "I want a guitar" and then classifies "guitar" into the category "musical instrument". The determining unit 3 also analyzes "Where is a store selling a guitar?" and then classifies "guitar" into the category "musical instrument". The determining unit 3 also analyzes "guitar" and then classifies "guitar" into the category "musical instrument".

Next, the determining unit 3 determines the degree of association between the category (first category) and the word (second word) based on the number of template sentences used in classifying the word into the category. In the example illustrated in FIG. 4A, in every template sentence applied with "guitar", "guitar" is classified into the category "musical instrument". Therefore, the determining unit 3 determines that the degree of association between the category "musical instrument" and "guitar" is 1.0.

FIG. 4B is a schematic illustrating a second example of the calculation of a degree of association between a word and categories in the first embodiment. The applying unit 2 inputs the category "musical instrument" to the calculating unit 1 and applies the one or more words (second words) received from the calculating unit 1 to one or more template sentences. In the example illustrated in FIG. 4B, "guitar", "piano", "recorder", and "harp" are illustrated as the one or more words received from the calculating unit 1.

The determining unit 3 analyzes the template sentences containing each of such words (second words) and classifies each word into one or more categories (first categories). In the example illustrated in FIG. 4B, the determining unit 3 analyzes "I want to buy a recorder" and then classifies "recorder" into the category "musical instrument". The determining unit 3 also analyzes "I want a recorder" and then classifies "recorder" into the category "musical instrument". The determining unit 3 also analyzes "Where is a store selling a recorder?" and then classifies "recorder" into the category "musical instrument". The determining unit 3 also analyzes "recorder" and then classifies "recorder" into a category "goods for kids".

Next, the determining unit 3 determines the degree of association between the categories (first categories) and the word (second word) based on the number of template sentences used in classifying the word into the categories. In the example illustrated in FIG. 4B, "recorder" is classified into the category "musical instrument" in three of the template sentences applied with "recorder". In one of the template sentences applied with "recorder", "recorder" is classified into the category "children's goods". Thus, the determining unit 3 determines that the degree of association between the category "musical instrument" and "recorder" is 0.75 and determines that the degree of association between the category "goods for kids" and "recorder" is 0.25.

Figure 5:
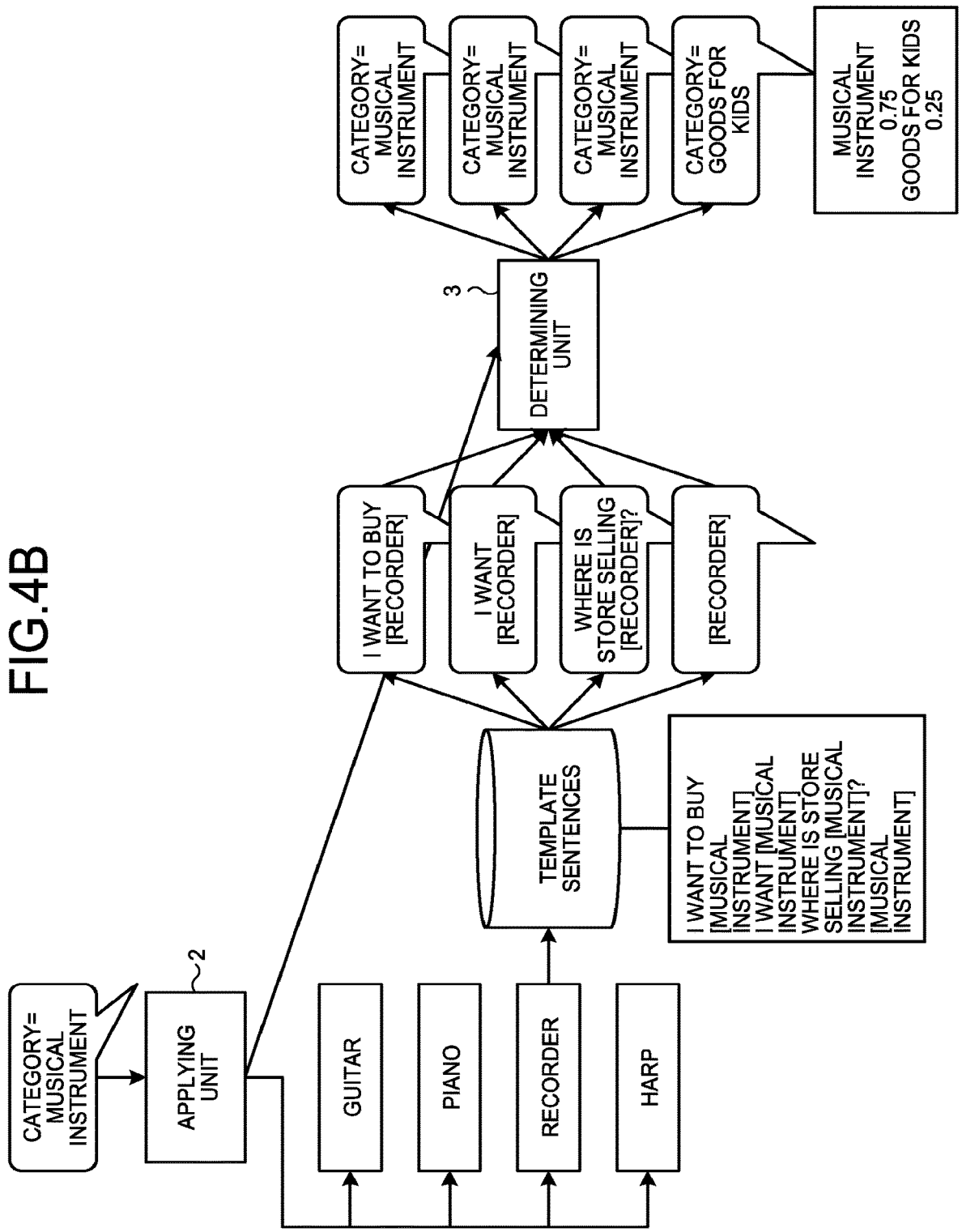
FIG. 5 is a schematic illustrating a first example of display information representing associations between words and categories in the first embodiment.

FIG. 5 is a schematic illustrating a first example of display information representing associations between words and categories in the first embodiment. In the example illustrated in FIG. 5, the associations between words and categories are visualized in a list format. In FIG. 5, the words associated with the categories are exhibited as search keywords. A degree of association is appended to search keywords each being associated with a plurality of categories.

Figure 6:
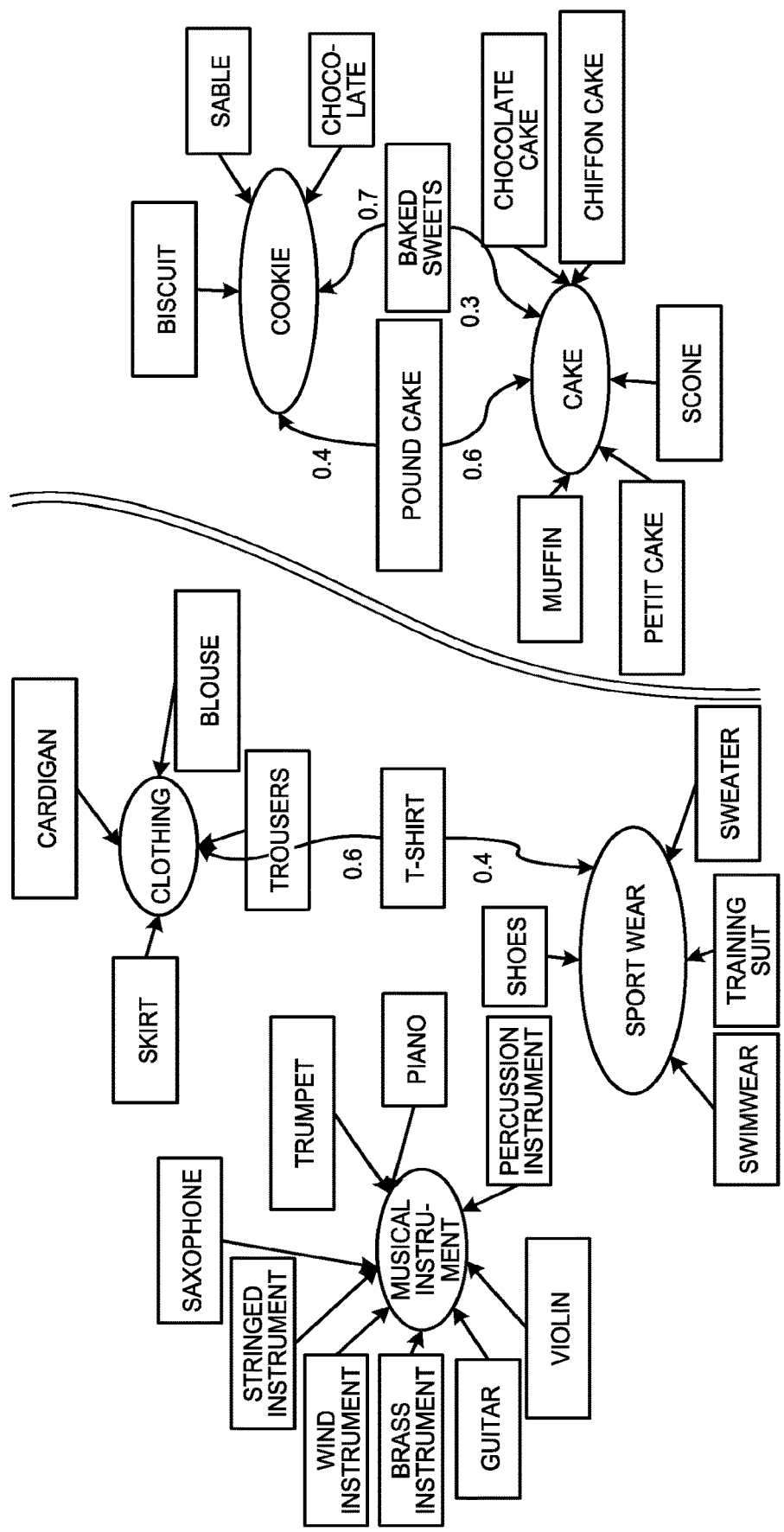
FIG. 6 is a schematic illustrating a second example of the display information representing associations between words and categories in the first embodiment.

FIG. 6 is a schematic illustrating a second example of the display information representing associations between words and categories in the first embodiment. In the example illustrated in FIG. 6, the associations between the words and the categories are visualized in a map format. In FIG. 6, words associated with a category are exhibited near the category. The position of each word is determined based on the degree of association between each word and the category, and the similarity between the words. A search keyword associated with a plurality of categories is connected to the categories via a plurality of arrows. A degree of association is appended to each of such arrows. In the example illustrated in FIG. 6, a similarity between words (search keywords) can be visualized based on a distance between the words.

Figure 7:
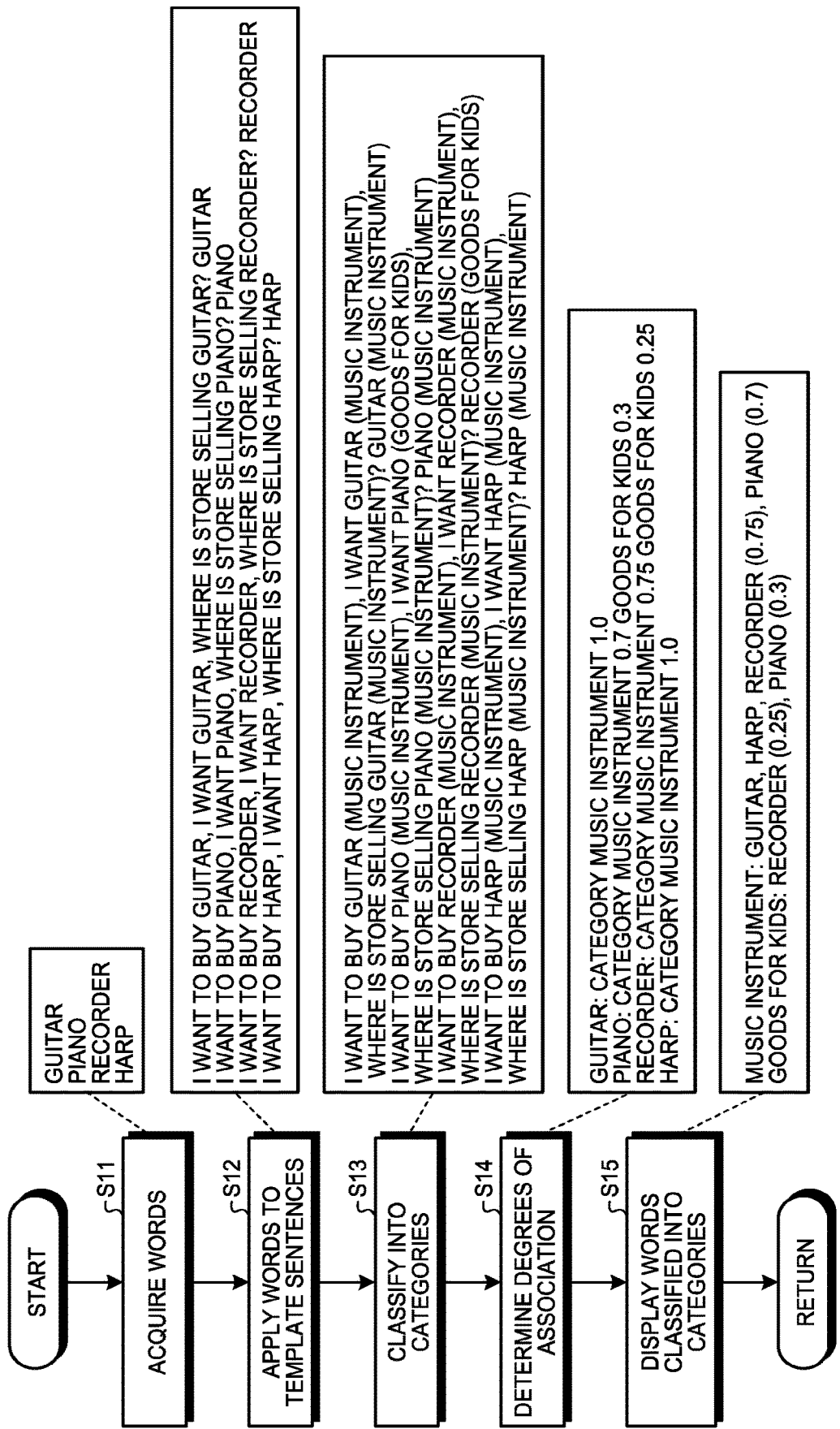
FIG. 7 is a flowchart illustrating an example of a method for calculating degrees of association between words and categories in the first embodiment.

FIG. 7 is a flowchart illustrating an example of a method for calculating a degree of association between a word and a category in the first embodiment. To begin with, the applying unit 2 inputs a word representing a category (first word) to the calculating unit 1 and acquires one or more words (second word) from the calculating unit 1 (Step S11). The applying unit 2 then applies the one or more words (second words) acquired in the process at Step S11 to one or more template sentences (Step S12).

The determining unit 3 analyzes the template sentences containing each of such words (second words) and classifies the word into one or more categories (first categories) (Step S13). The determining unit 3 then determines the degree of association between each of the categories (first categories) and the word (second word) based on the number of template sentences used in classifying the word into the category (Step S14).

The display control unit 4 displays, for each category (first category), the words (second words) used in the classification into the categories (first categories) on the display unit (Step S15). In the example illustrated in FIG. 7, when the degree of association is 1.0, the degree of association is not displayed, and when a word is associated with two or more categories, the word is displayed together with the corresponding degree of association.

As explained above, in the analyzing apparatus 10 according to the first embodiment, the calculating unit 1 calculates a similarity (first similarity) between a word representing a category (first word) and a word (second word). The applying unit 2 applies one or more second words, each having a first similarity higher than the first threshold, to one or more template sentences. The determining unit 3 analyzes the template sentences containing the second word and classifies the second word into one or more categories (first categories). The display control unit 4 displays, for each of the first categories, the second words used in the classification into the first categories on the display unit.

With the analyzing apparatus 10 according to the first embodiment, words associated with a category can be grasped more easily.

Second Embodiment

A second embodiment will now be explained. In explanations of the second embodiment, the explanations that are the same as those in the first embodiment are omitted.

There are sometimes cases in which, as a result of a user checking the words associated with the categories in FIGS. 5 and 6, the associations are not as intended by the user. One example is a case in which a word is associated with a category that is not semantically close to the word because an erroneous value is included in the setting of the calculating unit. As another example, it is not preferable, in store search, for a store classified under the category "musical instrument" but not selling a "piano" to be found with a keyword "piano". Therefore, explained in the second embodiment is an example in which the result of association between a category and a word can be changed when the result is unfavorable.

FIGS. 8 to 11 illustrate examples of display information (a user interface) for receiving a change, a deletion, and an addition on one or more categories (first categories) associated with a word (second word). In a search keyword section, any description can be entered. The search keywords visualized in FIGS. 5 and 6 may be entered, or a new search keyword may be entered. In a category section, a selection can be made from a list of categories that are currently in the content DB. When the display control unit 4 receives an input to the search keyword section, the display control unit 4 displays categories that are currently mapped to the search keyword of the input.

Figures 8, 9:
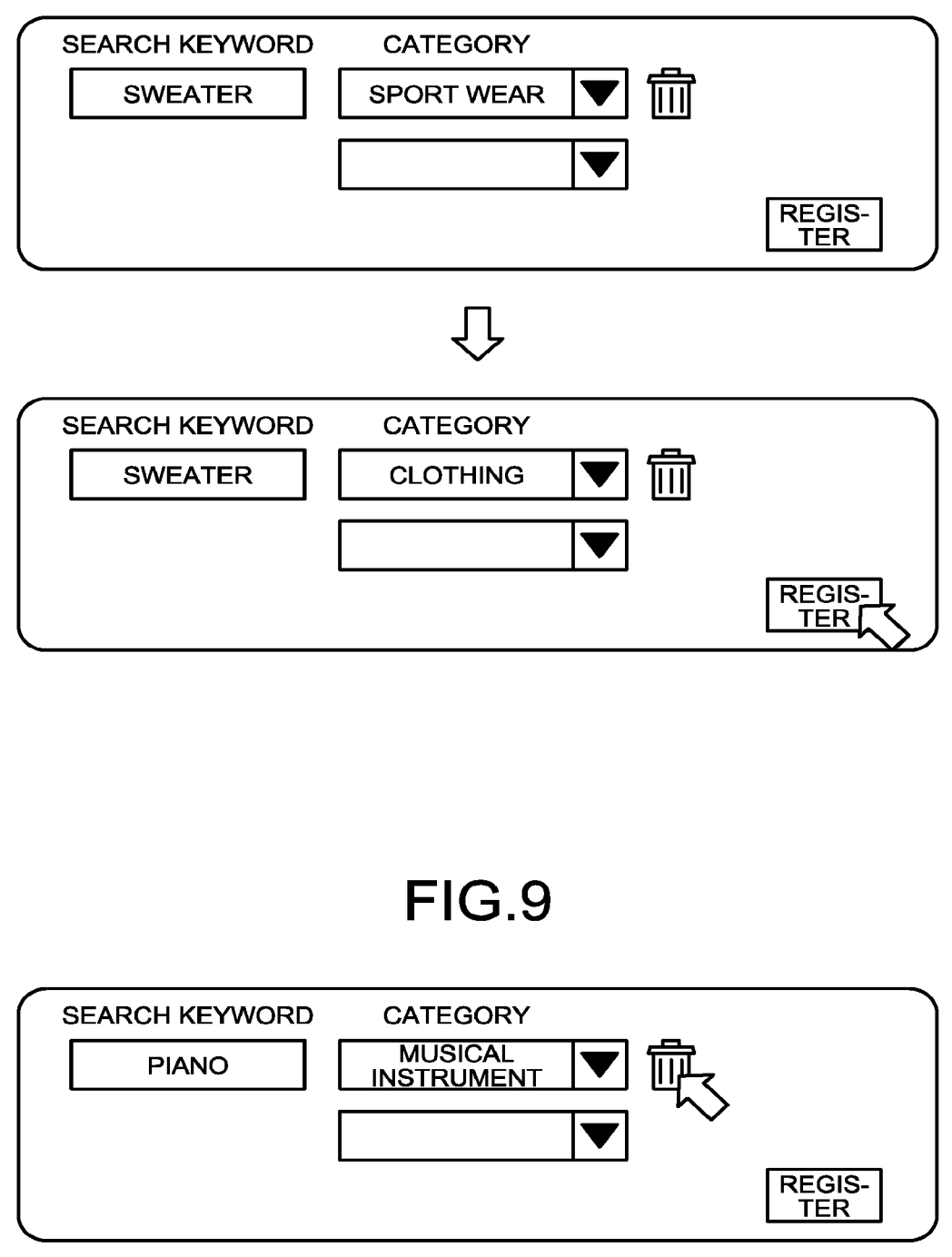

FIG. 8 is a schematic illustrating an example of display information for receiving a change in the category in the second embodiment. For example, when "sport wear" displayed in the category section is to be changed to "clothing", the display control unit 4 receives a pressing operation of the "register" button, and the change is reflected.

FIG. 9 is a schematic illustrating an example of display information for receiving a deletion of a category in the second embodiment. For example, when the display control unit 4 receives a pressing operation of the trash can icon next to the category "musical instrument" mapped to the search keyword "piano", a deletion of the word "piano" associated with the category "musical instrument" is reflected.

Figure 10:
FIG. 10 is a schematic illustrating an example of display information for receiving an addition of a category in the second embodiment.

FIG. 10 is a schematic illustrating an example of display information for receiving an addition of a category in the second embodiment. For example, when "cake" is to be added as a category associated to a search keyword "sable", the display control unit 4 receives a pressing operation of the "register" button, and an addition of the word "sable" to the category "cake" is reflected.

The user who implements the above-described change, deletion, or addition can make the operation on a simple user interface, as illustrated in FIGS. 8 to 11, to change any search keywords found to be unfavorable by looking at FIGS. 5 and 6, to an intended design, without any understanding of the mechanism of the system internal of the analyzing apparatus 10.

Methods for reflecting a change, a deletion, and an addition on one or more categories will now be explained. There are three possible methods for reflecting a change, a deletion, and an addition on categories.

The first method is to change the operation of the calculating unit 1. The calculating unit 1 changes the similarity to follow a change, a deletion, or an addition on one or more categories (first categories) associated with a word (second word). Specifically, for example, when a search keyword "sweater" is to be removed from a category "sport wear", the calculating unit 1 lowers the similarities between the search keyword "sweater" and the words associated with the category "sport wear" (to a level lower than the threshold). When a search keyword "sweater" is to be added to a category "clothing", the calculating unit 1 increases the similarities of the search keyword "sweater" and the words associated with the category "clothing" (to a level equal to or higher than the threshold).

The second method is to change the operation of the determining unit 3. The determining unit 3 performs a change, a deletion, or an addition on one or more categories, into which the word is classified, to follow a change, a deletion, or an addition on categories (first categories) associated with a word (second word). Specifically, although a learning model is used by the determining unit 3, an additional step is performed to change the determination result of the learning model in accordance with some rule, instead of just outputting the determination result as it is. Search keywords can be changed by changing this rule. For example, a search keyword "sweater" is to be removed from the category "sport wear", a rule is specified such that the category "sport wear" is removed even when the learning model outputs the category "sport wear". As another example, when a search keyword "sweater" is to be added to the category "clothing", a rule is specified such that the category "clothing" is added even when the learning model does not output the category "clothing".

The third method is to change the content DB. The determining unit 3 performs a change, a deletion, or an addition on one or more categories (second categories) registered for the content in the content DB to follow a change, a deletion, or an addition on categories (first categories) associated with a word (second word). Specifically, for example, a search keyword to be changed is established as a new category. When the search keyword "sweater" is to be changed, a category "sweater" is created. Since the search keyword "sweater" is mapped to the category "sweater" having the highest similarity to the search keyword "sweater", the search keyword is no longer mapped to any other categories. When the search keyword "sweater" is to be removed from the category "sport wear", for example, a category "sweater" is created. As another example, when a search keyword "sweater" is to be added to the category "clothing", a category "sweater" is created. The category "sweater" is additionally registered for content which has been registered under the category "clothing". During execution of the dialogue system 20, although the search keyword "sweater" is not handled as a category "clothing", the content registered under the category "clothing" is the same as the content registered under the category "sweater". Thus, the same search result is obtained by searching with the category "sweater".

When a search keyword is mapped to a plurality of categories, it is difficult to know, depending on the speech sentence, which category the search keyword is determined to belong to. Therefore, there are some cases where it is desirable for a search keyword to be mapped only to one category. For example, in the example illustrated in FIGS. 5 and 6, a search keyword "T shirt" belongs to both of the category "sport wear" and the category "clothing". When a change is to be performed such that the search keyword "T shirt" is only mapped to the category "clothing", the process of removing the search keyword "T shirt" from the category "sport wear" can be performed by using any one of the three methods described above.

Conversely, there are some cases in which it is desirable for a search keyword to be mapped to a plurality of categories. For example, in the example illustrated in FIGS. 5 and 6, a search keyword "baked sweets" is mapped to both of categories "cake" and "cookie". However, even when a speech sentence including "baked sweets" is input, both of the categories "cake" and "cookie" are not output at the same time. Instead, depending on the wording of the speech sentence, while the category "cake" is sometimes output, the category "cookie" is output in the other times. There are cases in which it is preferable to output both of the categories "cake" and "cookie" regardless of the wording of the speech sentence. Since both of such categories are not output even by changing the calculating unit 1, either the determining unit 3 or the content DB is changed.

In the case of changing the determining unit 3, a description to output both of the categories "cake" and "cookie" for a search keyword "baked sweets" is added to part of the subsequent rule processing. In the case of changing the content DB, a category "baked sweets" is created, and the category "baked sweets" is registered for all the content registered under the categories "cake" and "cookie". According to the changing, when the search keyword "baked sweets" is input, the category "baked sweets" is output, and content registered under the category "baked sweets" is found as match.

When a search keyword is mapped to a plurality of categories at the initial condition illustrated in FIGS. 5 and 6, a different category may be output depending on the wording of the speech sentence. Unless the user makes any particular change, those categories are registered as they are.

When a user establishes associations between a search keyword and a plurality of categories, as illustrated in FIG. 10, a plurality of categories are output regardless of what kind of speech sentence is to be received. A process of outputting a plurality of categories in the execution of search will now be explained specifically, using two methods as an example.

The first method is to narrow down the categories to one.

User: I want to buy baked sweets.

Dialogue system: Which one of cookie and cake do you like?

User: I like cookies.

Search query: select * from database where category LIKE "cookie".

The search keyword "baked sweets" is associated with both of the categories "cookie" and "cake", so that the determining unit 3 outputs the both categories. The dialogue system 20 then asks the user which of the categories the user likes, without executing the search at this stage, and executes the search after the user narrows down to one of the categories.

The second method is to execute search by using a plurality of categories as they are.

User: I want to buy baked sweets.

Search query: select * from database where category LIKE "cookie" OR category LIKE "cake".

Dialogue system: 20 hits are found. Do you have any preference in the price range?

User: I prefer a low price range.

Search query: select * from database where (category LIKE "cookie" OR category LIKE "cake") AND category LIKE "low price".

System: 5 hits are found.

The dialogue system 20 executes an OR search with the categories "cookie" and "cake". Content is then searched for by using another narrowing condition.

In the example described above, there is a possibility that the user has not decided which one of "cookie" and "cake" he/she prefers at the time when the user speaks "baked sweets". The first method described above is a method for allowing the user to decide which one. The second method is a method for executing search while keeping the selection ambiguous. The first method is advantageous in that the user can narrow down to a smaller number of hits more quickly because the number of search results is small. The second method is advantageous in that the user can narrow down the search results by using another condition when the user cannot decide which one of "cookie" and "cake" the user likes, so that the user is not forced into selecting from the options.

Third Embodiment

A third embodiment will now be explained. In explanations of the third embodiment, the explanations that are the same as those in the second embodiment are omitted. Explained in the third embodiment is an example in which a change in the words associated with a category is received by a more direct operation.

Figure 11:
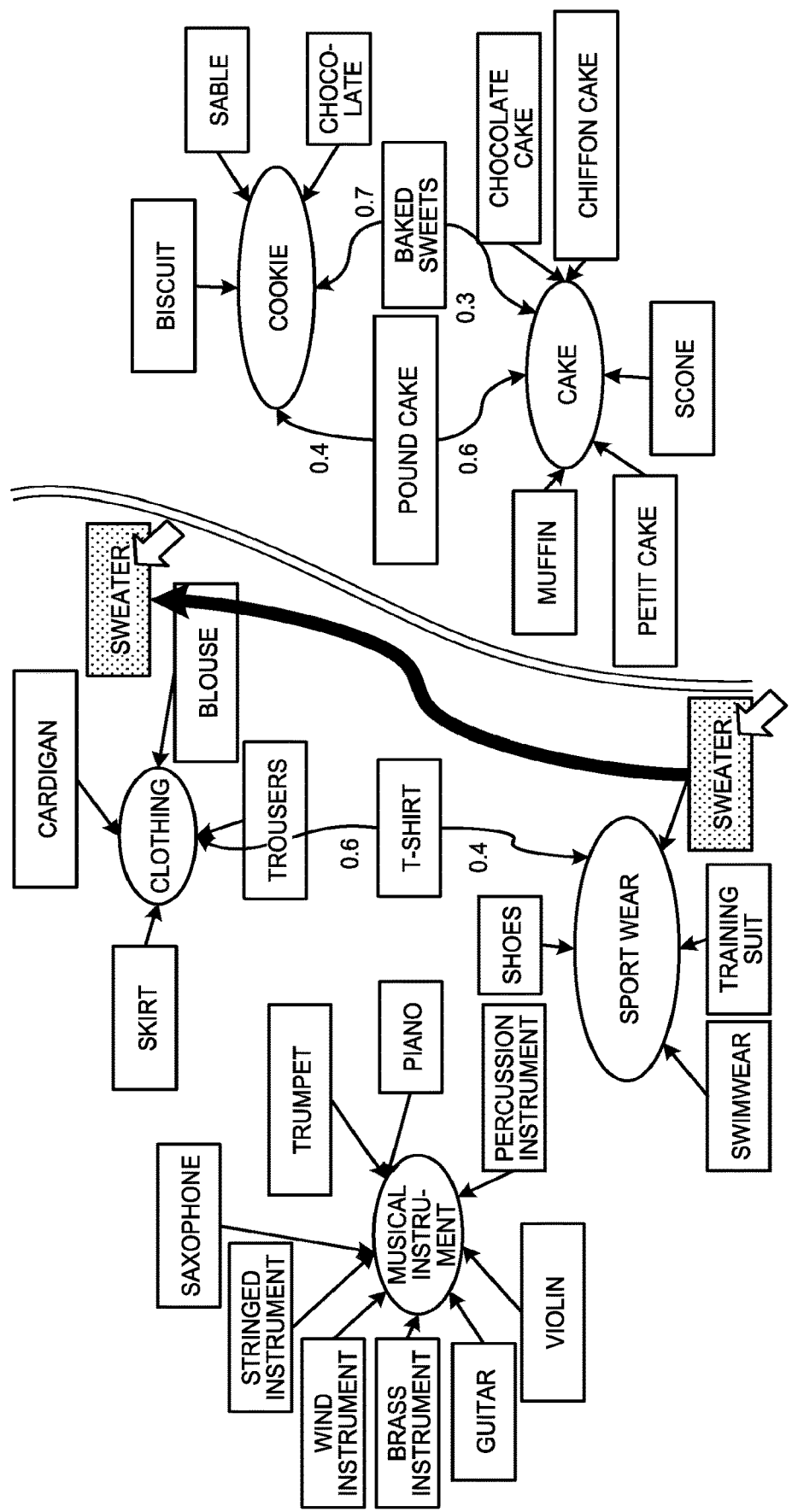
FIG. 11 is a schematic illustrating an example of display information for receiving a change in a degree of association between a word and categories in a third embodiment.

FIG. 11 is a schematic illustrating an example of display information for receiving a change in the degree of association between a word and a category in the third embodiment. The display format of the display information illustrated in FIG. 11 is the map format in which the associations between one or more categories (first categories) and words (second words) are represented by the positions of those categories and words. The display control unit 4 receives a change in the category, to which a word is associated, as an input representing a change in the position of the word. The calculating unit 1 then changes the similarity in accordance with the change in the position of the word.

Specifically, a user can drag the word (search keyword), and place the word to any position. The calculating unit 1 updates the similarities between the words being displayed, based on where the word is placed. The determining unit 3 then calculates the degrees of association between the words and categories, and the display control unit 4 updates the display information.

Also in the methods illustrated in FIGS. 8 to 10 and explained in the second embodiment, the similarity calculating process performed by the calculating unit 1 is changed to change the association between a word and a category. However, the resultant similarity may be not as intended by the user. By contrast, with the method illustrated in FIG. 11, the position of the word (search keyword) can be changed freely, so that the similarity between words can be changed to any intended value based on the positions of the words. By setting the similarity to a preferable value, for example, it is not necessary to correct the operation of the calculating unit 1 again even when the calculating unit 1 is to be used in another domain.

Fourth Embodiment

A fourth embodiment will now be explained. In explanations of the fourth embodiment, the explanations that are the same as those in the second embodiment are omitted. Explained in the fourth embodiment is a first example in which a word associated with a category is changed across the entire domains, and in which the word is changed for each domain.

There are two possible reasons for changing the association between a word (search keyword) and a category, for example. The first reason is that the operation of the calculating unit 1 is wrong. The second reason is that a search keyword mapped to the category is not applicable to the content. An example of the second reason includes a case where the content registered under the category "musical instrument" does not handle a search keyword "piano".

The calculating unit 1 is generated from a model trained with a large number of documents, for example. With a model trained in such a manner that a higher similarity is calculated for words used in the same context, a higher similarity may arise between words that are used in the same context at a high frequency, even if they have completely different meanings. For example, while words "spicy" and "sweet" have completely opposite meaning, these words are often used in the equivalent contexts, for example, "I love something sweet" and "I love something spicy". The similarity of these words is relatively high. Therefore, it is highly likely that, in the dialogue system 20, these two words are associated with the same categories. However, for example, it is unfavorable for the search keyword "spicy" to be included in the category "sweets". Therefore, the search keyword "spicy" should be removed from the category "sweets".

Such incorrectness can be attributed to the calculating unit 1, so that it is preferable to change the operation of the calculating unit 1. In other words, the operation is changed in such a manner that the similarity between the category "sweets" and the search keyword "spicy" is reduced. Since the high similarity between "sweets" and "spicy" is unfavorable in a general sense without any dependency on the domains, it is highly likely for such a change to be required in the other domains. Therefore, the calculating unit 1 is shared among the domains, and the change is also shared among the domains to prevent repetition of the same change at the other domains. By this, a general change that is not domain-dependent can be shared so that it is not necessary to make the same change repeatedly.

A domain-dependent change and a change shared among the domains can be implemented separately by: holding the calculating unit 1 to share among the domains; holding a determining unit 3 for each domain; reflecting a domain-independent change at the calculating unit 1; and reflecting a domain-dependent change at the determining unit 3 or the content DB.

Modification of Fourth Embodiment

A modification of the fourth embodiment will now be explained. In explanations of the modification, the explanations that are the same as those in the fourth embodiment are omitted. Explained now in the modification is a second example in which a change in the word associated with a category is implemented across the domains.

In the modification, the calculating unit 1 and the determining unit 3 are held to share among the domains, and the content DB is held for each domain. By configuring in such a manner that a domain-independent change is reflected in the calculating unit 1 or the determining unit 3, and a domain-dependent change is reflected in the content DB, a domain-dependent change and a change shared among the domains can be implemented separately.

Development of the calculating unit 1 and the determining unit 3 accrues costs for various reasons, for example, a large amount of training data is required. Therefore, by holding these units to share among the domains, instead of having these units for each domain, only required is a creation of a content DB when a new domain is created. Thus, a new domain can be created at a low cost.

Fifth Embodiment

A fifth embodiment will now be explained. In the explanations of the fifth embodiment, the explanations that are the same as those in the first embodiment are omitted. While explained in the first embodiment is an example of store search, an example of an in-house help desk will be explained in the fifth embodiment.

Figure 12:
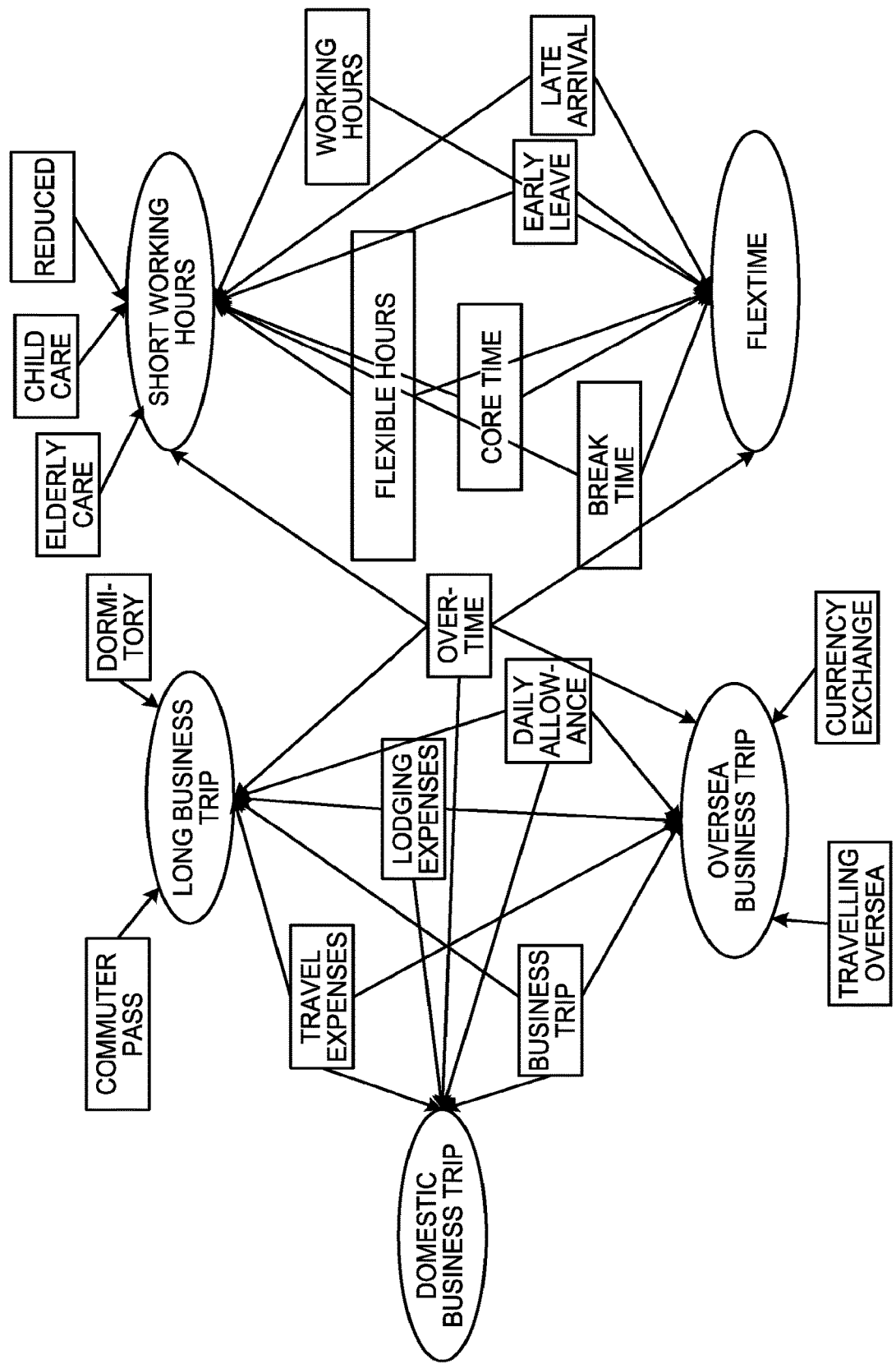
FIG. 12 is a schematic illustrating an example of display information representing associations between words and categories in a fifth embodiment.
Figure 13:
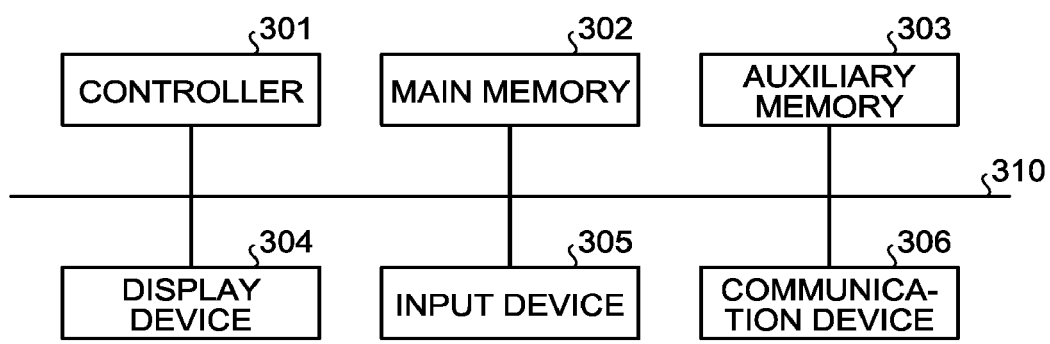
FIG. 13 is a schematic illustrating an example of a hardware configuration of an analyzing apparatus according to the first to the fifth embodiments.

FIG. 12 is a schematic illustrating an example of display information representing an association between a word and a category in the fifth embodiment. In FIG. 12, a visualization example using a scenario of a domain of an in-house help desk is illustrated. In the foregoing store search, categories have low semantic similarities, and most of the search keywords are not shared among the categories. However, depending on the type of the domains, it can be seen that many keywords are shared among the categories, as illustrated in FIG. 12. By enabling a user to check which search keywords are to be shared by using the analyzing apparatus 10 according to the fifth embodiment, it is possible to create a more preferable dialogue system 20.

Finally, an example of a hardware configuration of the analyzing apparatus 10 according to the first to the fifth embodiments will now be explained.

Example of Hardware Configuration

FIG. 10 is a schematic illustrating an example of a hardware configuration of the analyzing apparatus 10 according to the first to the fifth embodiments. The analyzing apparatus 10 according to the first to the fifth embodiments includes a controller 301, a main memory 302, an auxiliary memory 303, a display device 304, an input device 305, and a communication device 306. The controller 301, the main memory 302, the auxiliary memory 303, the display device 304, the input device 305, and the communication device 306 are connected to one another via a bus 310.

The controller 301 is implemented by one or more hardware processors. The controller 301 executes a computer program having been read from the auxiliary memory 303 onto the main memory 302. The computer program corresponds to the calculating unit 1, the applying unit 2, the determining unit 3, and the display control unit 4 in the analyzing apparatus 10 (FIG. 1) described above. The main memory 302 is a memory such as a read-only memory (ROM) and a random access memory (RAM). The auxiliary memory 303 is a hard disk drive (HDD) or a memory card, for example.

The display device 304 displays display information. The display device 304 is, for example, a liquid crystal display. The input device 305 is an interface for operating the analyzing apparatus 10. The input device 305 is, for example, a keyboard or a mouse. When the analyzing apparatus 10 is a smart device such as a smartphone or a tablet terminal, the display device 304 and the input device 305 is a touch panel, for example. The communication device 306 is an interface for communicating with another device.

A computer program executed by the analyzing apparatus 10 according to the first to the fifth embodiments is provided as a computer program product that is stored in a computer-readable recording medium, such as a compact disc read-only memory (CD-ROM), a memory card, a compact disc recordable (CD-R), or a digital versatile disc (DVD), as an installable or executable file.

The computer program executed by the analyzing apparatus 10 according to the first to the fifth embodiments may alternatively be stored on a computer connected to a network such as the Internet, and be made available for download over the network. The computer program executed by the analyzing apparatus 10 according to the first to the fifth embodiments may be provided over a network such as the Internet, without making the computer program available for download.

The computer program of the analyzing apparatus 10 according to the first to the fifth embodiments may be provided by programming in a ROM or the like in advance.

The computer program executed by the analyzing apparatus 10 according to the first to the fifth embodiments has a modular configuration including functional blocks that can be implemented as a computer program, among the functional blocks described above. As actual hardware, by causing the controller 301 to read the computer program from a recording medium and executing the computer program, such functional blocks are loaded onto the main memory 302. In other words, the functional blocks described above are generated on the main memory 302.

The whole or a part of the functional blocks described above may be implemented as hardware such as an integrated circuit (IC), instead of software.

When the functions are implemented using a plurality of processors, each of the processors may implement one of the functions, or implement two or more of the functions.

The analyzing apparatus 10 according to the first to the fifth embodiments may be operated in any way. For example, the analyzing apparatus 10 according to the first to the fifth embodiments may be operated as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An analyzing apparatus comprising:
a memory; and
a hardware processor coupled to the memory and configured to:
receive an input of a first word representing an analyzing-target category name;
calculate a first similarity between the first word and a second word stored in a storage device;
apply, to one or more template sentences, each of one or more second words having the first similarity higher than a first threshold;
analyze the one or more template sentences each including the second word and classify the second word into one or more first categories;
generate display information that displays, for each of the first categories, the second word used in the classification into the first categories, the display information being represented in a map format in which an association between the one or more first categories and the second word is represented by a position of the first categories and a position of the second word; and
display the display information via a user interface on a display device.

2. The apparatus according to claim 1, wherein the hardware processor is further configured to search for content based on the first categories.

3. The apparatus according to claim 1, wherein the hardware processor is further configured to:
determine a degree of association between each of the first categories and the second word based on a number of template sentences used when classifying the second word into the one or more first categories; and
display the second word together with the degree of association.

4. The apparatus according to claim 1, wherein the hardware processor is further configured to display the display information for receiving a change, a deletion, or an addition on the one or more first categories associated with the second word.

5. The apparatus according to claim 4, wherein the hardware processor is further configured to change the first similarity to follow the change, the deletion, or the addition on the one or more first categories associated with the second word.

6. The apparatus according to claim 4, wherein the hardware processor is further configured to perform a change, a deletion, or an addition on the one or more first categories, into which the second word is classified, to follow the change, the deletion, or the addition on the one or more first categories associated with the second word.

7. The apparatus according to claim 4, further comprising a content database that stores content and a second category representing a classification of the content in a manner that the content and the second category are associated with each other,
wherein the hardware processor is further configured to perform a change, a deletion, or an addition on the second category to follow the change, the deletion, or the addition on the one or more first categories associated with the second word.

8. The apparatus according to claim 4, wherein
the hardware processor is further configured to:
receive a change on the first categories associated with the second word by an input representing a change in the position of the second word; and
change the first similarity to follow the change in the position of the second word.

9. The apparatus according to claim 1, the hardware processor is further configured to:
receive speech data;
calculate a second similarity between a third word included in the speech data and the first word; and
calculate a first similarity between the first word and the second word, the first word having the second similarity higher than a second threshold.

10. An analyzing method implemented by a computer, the method comprising:
receiving an input of a first word representing an analyzing-target category name;
calculating a first similarity between the first word and a second word stored in a storage device;
applying, to one or more template sentences, each of one or more second words having the first similarity higher than a first threshold;
analyzing the one or more template sentences each including the second word and classifying the second word into one or more first categories;
generating display information that displays, for each of the first categories, the second word used in the classification into the first categories, the display information being represented in a map format in which an association between the one or more first categories and the second word is represented by a position of the first categories and a position of the second word; and
displaying the display information via a user interface on a display device.

11. A computer program product comprising a non-transitory computer-readable recording medium on which an executable program is recorded, the program instructing a computer to:
receive an input of a first word representing an analyzing-target category name;
calculate a first similarity between the first word and a second word stored in a storage device;
apply, to one or more template sentences, each of one or more second words having the first similarity higher than a first threshold;
analyze the one or more template sentences each including the second word and classify the second word into one or more first categories;
generate display information that displays, for each of the first categories, the second word used in the classification into the first categories, the display information being represented in a map format in which an association between the one or more first categories and the second word is represented by a position of the first categories and a position of the second word; and
display the display information via a user interface on a display device.

* * * * *